United States Patent Office 3,142,989
Patented Aug. 4, 1964

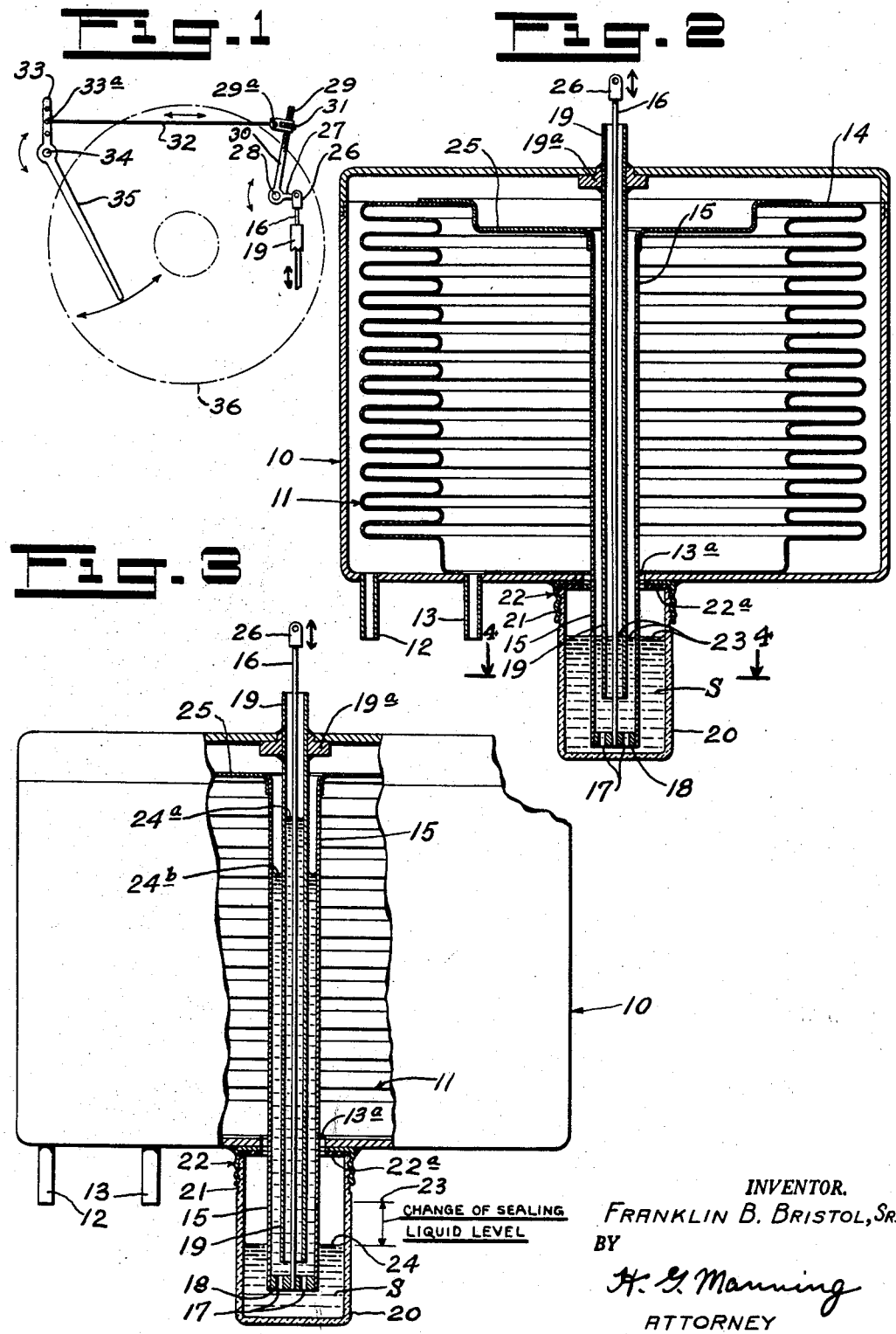

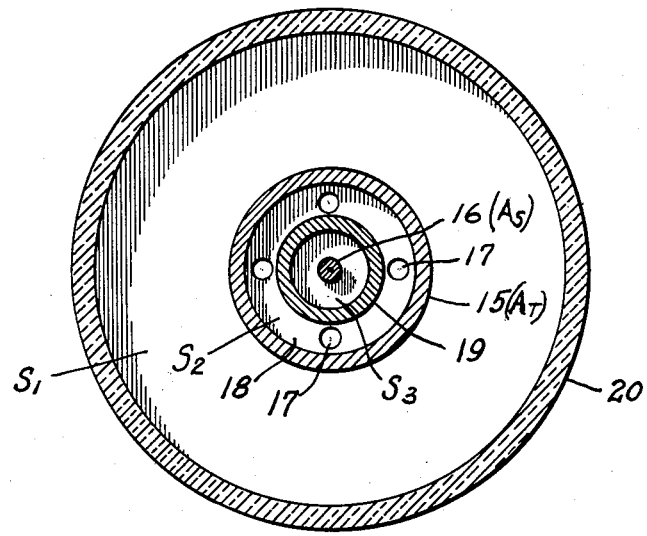

1

3,142,989
LIQUID SEAL FOR DIFFERENTIAL PRESSURE
APPARATUS
Franklin B. Bristol, Sr., Three Mile Hill,
Middlebury, Conn.
Filed Apr. 9, 1962, Ser. No. 185,976
8 Claims. (Cl. 73—407)

This invention relates to instruments, and more particularly to a differential pressure measuring instrument for determining the rate of flow, draft, specific gravity, etc., of fluids.

The invention relates further to means for the transmission of limited motion through the rigid wall of an instrument casing, and is especially applicable to incorporation in a differential pressure apparatus, such as an enclosed bellows in a manometer, to indicate the difference between the internal and external fluid pressures applied thereto.

In devices for measuring the difference between two fluid pressures applied to opposite sides of a manometer element, it is obvious that if both of these pressures are other than atmospheric, both sides must be sealed from the atmosphere. Under this condition, there arises the problem of transmitting the motion of the measuring element to the exterior of the sealing means, where it may be utilized and observed.

In the design of previous differential manometers, for example those especially adapted for use in the determination of fluid flow, many expedients have been resorted to in order to accomplish this purpose. These include numerous forms of stuffing boxes, magnetic transmission devices, and flexible mechanical transmissions which yield in response to the motion of the measuring element. They also include various types of liquid seals in which the fluid pressures are resisted by the static head of the sealing liquid.

Transmissions using stuffing boxes are subject to a certain amount of leakage or friction, or both, and any attempt to decrease either said leakage or said friction is accompanied by a tendency to increase the other.

Magnetic transmissions have sometimes been employed in this connection, but they require that the wall of the containing element have a portion including a considerable area of thin, nonmagnetic material in order that the transmitting magnet and its armature will be brought into sufficiently close proximity to the indicating mechanism so that a positive reproduction of readings by the external mechanism may be secured.

Attempts have also been made to utilize flexible metallic seals having flexing members, such as torque tubes, which are subjected to relatively high stresses, but such seals necessitate that a relatively large amount of power from the measuring element be utilized in deforming the flexing members. Such seals also require that compensation for the elastic properties of the flexing members must be incorporated into the instrument to permit calibration thereof.

Since it is impractical to design a resilient element which will possess the desired sealing properties, and also have a satisfactory uniform law of response, instruments designed to utilize the principle of the flexible seal are also subject to sources of error which seriously detract from the accuracy of the measurements.

In order to eliminate some of the disadvantages described above, flexible metallic seals have been previously devised, which embody a multiplicity of parts, including a linkage mechanism enclosed in a yielding flexible shell or a bellows, provided with flanges and seals, resilient flexures for stabilizing the transmission of motion, and other hardware. These forms of metallic seals are objectionable on account of their complexity, and the fact that a certain amount of adjustment and calibration is required to set up the apparatus. A further objection is that an appreciable resistance is offered to the deflection of the internal measuring bellows.

Previously known liquid seals, in which some part of the motion transmitting means is submerged in a suitable sealing liquid, and the fluid pressures within the instrument casing are resisted and contained by the static head of the sealing liquid, inherently have static pressure errors caused directly by the action of the static pressure on the moving parts, and indirectly by the changes in level of the sealing liquid. Thus, static pressure, such as that of the atmosphere, or equivalent pressures within the casing and on opposite sides of the measuring element, produce an undesirable deflection of the motion transmitting apparatus due to the buoyancy of the submerged parts.

In order to eliminate this objection, sealing means have been devised in which two liquid seals are connected to act in opposition, thereby obviating the static pressure effect (see the De Bruyn Patent No. 841,618, entitled "Apparatus for Measuring Gas Pressures," dated January 18, 1907). Such sealing means comprises an objectionable duplication of sealing parts, as well as requiring additional links and levers to accomplish the cancellation of the static pressure effect.

One object of the present invention is to provide means for transmitting very low differential pressures from a highly sensitive pressure-responsive element, such as a bellows located within a casing, to an indicator member outside of said casing, for the purpose of observing, recording, controlling, said differential pressure, without interference from the surrounding atmospheric conditions or ambient static pressure.

A further object is to provide an apparatus of the above nature in which the means for transmitting motion will not affect the deflections of the internal element or the external indicator member.

A further object is to provide means for obtaining an extremely precise transmission of the response from the pressure-sensitive element without mechanical frictional resistance, lost motion, backlash, or leakage.

A further object is to provide an apparatus of the above nature having means for transmitting motion from the interior of a casing to the exterior thereof without the aid of mechanical devices such as pivots, knife edges, links, bearings, bellows, diaphragms, torque tubes, magnets, etc.

A still further object is to provide an apparatus of the above nature wherein the internal measuring element, such as a bellows, cannot be damaged by "overranging."

Another object is to provide an instrument of the above nature which requires negligible power from the internal measuring element to transmit the motion of that element to the exterior indicator member.

A further object is to provide an instrument of the above nature which will be simple in construction, inexpensive to manufacture, easy to install and manipulate, compact, ornamental in appearance, and efficient and durable in use.

This application is a continuation in part of my co-pending application, Serial No. 6,649, filed February 4, 1960, for "Liquid Seal for Differential Pressure Apparatus," now abandoned.

With these and other objects in view, there has been illustrated on the accompanying drawing, one form in which the invention may conveniently be embodied in practice.

In the drawing,

FIG. 1 represents a schematic view of a differential pressure measuring apparatus connected to the improved liquid sealing apparatus embodying the invention.

FIG. 2 is a cross-sectional view, on a larger scale, of the liquid sealing apparatus with no pressure applied, and in which the levels of the liquid seal in the well, the movable tube, and the stationary tube are the same.

FIG. 3 is a similar cross-sectional view, where the pressure within and without the bellows is greater than atmospheric, and showing the new relative positions of the different levels of the sealing liquid in the container, the moving tube, and the stationary tube.

FIG. 4 is an enlarged cross-sectional view of the liquid sealing apparatus, taken on line 4—4 of FIG. 2, illustrating the shape of the output shaft, the movable tube, the stationary tube, the well, the casing, and the three portions of the sealing liquid.

Referring now to the drawing, in which like reference numerals denote corresponding parts throughout the several views, the numeral 10 indicates an outer casing having mounted therein a bellows 11 which is responsive to small changes in the fluid pressures applied to the inner and outer portions thereof. A pair of open tubes 12, 13 are provided in the bottom wall of the outer casing 10 for connecting the fluid pressure sources (not shown) to the inner and outer portions of the bellows 11.

The larger fluid pressure source is normally connected to the inner portion of the bellows 11, and is transmitted to the sealing liquid within a container well 20 and outside a movable tube 15, both of which are to be further described.

The upper end 14 of the bellows is free to move vertically and surrounds a vertical movable tube 15 to which it is rigidly attached and tightly sealed as shown. A shallow horizontal recess 25 is provided in the upper end 14 of the bellows 11 to serve as an emergency reservoir. Within the tube 15 and fixed rigidly to its lower end, by a perforated disk 18 is an upstanding movable output shaft 16.

Surrounding the output shaft 16, and located within the movable tube 15 is a stationary tube 19 fixed at its upper end to the outer casing 10. The numeral 19a indicates a stepped ring flange fitted around the fixed tube 19 for rigidly attaching said tube to the top of the casing 10 to which it is tightly sealed as shown.

The movable tube 15, the stationary tube 19, and the movable output shaft 16, are immersed at their lower ends in a sealing liquid S, which is initially located within the depending detachable container well 20 of larger diameter than said movable tube 15, and which well 20 is rigidly connected to the bottom of the outer casing 10. The liquid well 20 is preferably attached to the outer casing in such a manner as to be removable therefrom for emptying and filling the sealing liquid S. This well 20 is preferably made of translucent or transparent material to permit the viewing of the level of the sealing liquid S located therewithin.

Referring to FIG. 4 of the drawing, $A_T$ represents the cross-sectional area of the movable tube 15, and $A_S$ the cross-sectional area of the output shaft 16. Also the letters $S_1$, $S_2$, and $S_3$, represent, respectively, the cross-sectional areas of the liquid within the container well 20 and outside the movable tube 15; between the movable tube 15 and the stationary tube 19; and within the stationary tube 19.

In order to obviate the effect of pressure changes other than those of the measured pressures, the magnitudes of these sectional areas $S_1$, $S_2$, $S_3$, must bear a certain relationship with respect to each other, as will be described hereinafter.

It will be understood that if desired, the exterior of the well 20 may be marked with a vertical scale to indicate the minimum and maximum positions of the level of the sealing liquid S within said well, which will facilitate the calibration thereof.

As clearly shown in FIGS. 2 and 3 of the drawing, the disk 18, in the bottom of the moving tube 15, has a plurality of apertures 17 through which the sealing liquid S may freely pass.

In order to provide for the detachability of the liquid containing well 20, the latter is provided with external threads 21 at the upper end thereof for engaging within a threaded casing sleeve 22 which is rigidly secured and tightly fixed, as by soldering to the bottom of the casing 10. Provision is also made of a gasket washer 22a to produce a tight seal between the container well 20 and the casing 10.

The numeral 23 (FIGS. 2 and 3) indicates the liquid level, with atmospheric pressure applied within and without the bellows 11. When different pressures are applied, the numerals 24, 24a and 24b (FIG. 3) indicate the new resultant liquid levels in the container well 20, the stationary tube 19, and the movable tube 15, respectively.

The output shaft 16 may be connected to an exterior indicator member, such as a pen, pointer, or control mechanism, by any well known arrangement of lever arms and links such as shown for example in FIG. 1. This system of links and levers also provides a means for calibrating the motion of the output shaft 16 with respect to a predetermined scale on a circular chart 36.

To this end, provision is made of lever arms 27 and 30 which rotate together as a bell crank around a fixed pivot 28. A lever arm 33 and an indicator pointer 35 rotate together as a bell crank around a fixed pivot 34. The lever arms 30 and 33 are connected by a vertically adjustable pivot yoke 29a and a pivot pin 33a to the ends of a link 32. The motion of the vertical output shaft 16 connected to the lever arm 27 by the pivot 26 is thus transmitted to an indicator pointer 35 which moves over the chart 36. The end of the arm 30 is threaded at 29 and is provided with an adjustable nut wheel 31 embraced within the yoke 29a connected to the link 32.

By means of the above construction, it will be clear that changes in the level of the sealing liquid S relative to the movable tube 15 and the output shaft 16, will cause variations in the buoyancy exerted upon said movable tube 15 and said movable output shaft 16.

Buoyancy variations caused by changes in the pressure to be measured will generally be slight and, in any case, will have an affect which will ordinarily be linear with respect to the pressure changes.

*Operation*

The liquid S serves to seal from the atmosphere and from each other the pressures or vacuums applied to the inner and outer portions of the bellows 11, or other types of differential pressure element.

In use, as pressures are applied, the bellows 11, the movable tube 15, and the movable output shaft 16 will assume new positions depending upon said different pressures. Likewise, the sealing liquid S will assume new levels, while continuing to act as a seal, as shown in FIG. 3 of the drawing. By properly proportioning the cross-sectional areas of the liquid and the movable parts of the seal, the entire instrument may thus be made independent of ambient static and atmospheric pressures.

It will also be understood that excessive pressure or vacuum will force the sealing liquid S out of the top of the movable tube 15 into the reservoir 25, so that the bellows 11 and pointer 35 cannot be damaged by "over-ranging."

A mathematical explanation of the static pressure error of the liquid seal will now be given:

Thus, denoting the static pressure as $P_S$, the differential pressure as $P_D$, the effective area of the measuring element outside of the movable tube 15 as $A_E$, and otherwise following the notation of FIG. 4, the static pressure error E of the liquid seal indicated as a percentage of the calibrated output motion, can be expressed as:

$$E = \frac{P_S[A_S(S_1+S_2) - A_T S_3]100}{P_D[(A_S+A_T)S_1 + A_E(S_1+S_2+S_3)]}$$

where,

E is the static pressure error of the liquid seal,
$P_S$ is the ambient static pressure,
$P_D$ is the differential pressure,
$A_S$ is the cross-sectional area of the output of shaft 16,
$A_T$ is the cross-sectional area of the movable tube 15,
$A_E$ is the effective cross-sectional area of the pressure measuring element 11 outside the movable tube,
$S_1$ is the cross-sectional area of the sealing liquid between the liquid containing well 20 and the movable tube 15,
$S_2$ is the cross-sectional area of the sealing liquid between the movable tube 15 and the stationary tube 19, and
$S_3$ is the cross-sectional area between the output shaft 16 and the stationary tube 19.

This equation is derived in the following manner:

It is required that the output shaft 16 remain stationary while static pressure is applied to the open tubes 12, 13. The force necessary to hold the said shaft 16 stationary is the ratio of the applied static pressure error force to the applied input pressure force, or $$E = \frac{F_E \times 100\%}{F_I}$$

where
$F_E$ is the static pressure error force, and
$F_I$ is the applied input pressure force.

Other terms required for the derivation are:

$\Delta L_1$ is the change in level of the sealing liquid between the liquid containing well 20 and the movable tube 15, with reference to its level with no pressure applied.

$\Delta L_2$ is the change in level of the sealing liquid between the movable tube 15 and the stationary tube 19, with reference to its level with no pressure applied.

$\Delta L_3$ is the change of level of the sealing liquid $S_3$ between the output shaft 16 and the stationary tube 19, with reference to its level with no pressure applied.

$d$ is the density of the sealing liquid.

When static pressure only is applied to the open tubes 12, 13, the levels of each section of the sealing liquid will change such that:

$$\Delta L_1 = \Delta L_2 \quad (1)$$

and $$\Delta L_3 = \Delta L_1 \left( \frac{S_1 + S_2}{S_3} \right) \quad (2)$$

These changes of level of the sealing liquid S cause changes of the buoyancy forces on the movable tube 15 and the output shaft 16. Assuming that a positive static pressure is applied, The downward buoyancy force
on the movable tube $15 = -\Delta L_1 A_T d \quad (3)$ The upward buoyancy force on
the output shaft $16 = \Delta L_3 A_S d \quad (4)$ The static pressure error force is the sum of these buoyancy forces, or $$F_E = \Delta L_3 A_S d - \Delta L_1 A_T d \quad (5)$$

Substituting $\Delta L_3$ of Equation 2 into Equation 5, we have $$F_E = \Delta L_1 d \left( A_S \frac{S_1 + S_2}{S_3} - A_T \right) \quad (6)$$

Also, the static pressure $$P_S = (\Delta L_1 + \Delta L_3) d \quad (7)$$

Substituting $\Delta L_3$ of Equation 2 into Equation 7, we have $$P_S = \Delta L_1 d \left( \frac{S_1 + S_2 + S_3}{S_3} \right)$$

or $$\Delta L_1 d = \frac{P_S S_3}{S_1 + S_2 + S_3} \quad (8)$$

Substituting $\Delta L_1 d$ of Equation 8 into Equation 6, we have $$F_E = \left( \frac{P_S S_3}{S_1 + S_2 + S_3} \right) \left( A_S \frac{S_1 + S_2}{S_3} - A_T \right)$$

or $$F_E = \frac{P_S}{S_1 + S_2 + S_3} [A_S(S_1 + S_2) - A_T S_3] \quad (9)$$

The applied input pressure force $F_I$ is effected by the application of the measured differential pressure $P_D$ to the pressure measuring element 11, and the movable parts of the liquid seal. As has been previously disclosed, the buoyancy forces caused by the measured differential pressure will be slight in comparison to the forces caused by that pressure acting upon the areas, $A_S$, $A_T$, and $A_E$, of the movable parts. In this case, $$F_I = P_D (A_S + A_T + A_E) \quad (10)$$

If the buoyancy forces caused by the measured differential pressure are considered, Equation 10 will be modified to $$F_I = P_D \left[ (A_S + A_T) \frac{S_1}{S_1 + S_2 + S_3} + A_E \right]$$

or $$F_I = P_D \left[ \frac{(A_S + A_T) S_1 + A_E (S_1 + S_2 + S_3)}{S_1 + S_2 + S_3} \right] \quad (11)$$

It is apparent from Equation 11 that the displacement of the sealing liquid has reduced the total area upon which the input pressure is applied.

Therefore, by combining Equations 9 and 11, the static pressure error is $$E = \frac{P_S [A_S(S_1 + S_2) - A_T S_3] 100\%}{P_D [(A_S + A_T) S_1 + A_E (S_1 + S_2 + S_3)]} \quad (12)$$

From the above equation it can be seen that the static pressure error E can be reduced to zero by constructing the liquid seal in such a way that the two expressions in the numerator $A_S(S_1 + S_2)$ and $A_T S_3$ are equal or $$A_S(S_1 + S_2) = A_T S_3 \quad (13)$$

Thus, it is apparent that the elimination of the static pressure error can be accomplished by the proper choice of dimensions of the liquid seal components, and it is independent of the materials of construction or the density of the sealing liquid.

Since it is not the size, but the relative proportions of the parts of the liquid seal which is important, these parts can be ruggedly constructed and easily manufactured.

Because of the negative sign in the numerator of the above equation indicating the static pressure error, it can also be seen that if a positive or negative static pressure error is caused by one part of the instrument, for example by the outer casing, which might distort under pressure, this error can be compensated for by constructing the liquid seal to have an opposing static pressure error of equal magnitude. If the larger measured pressure is applied to the outside of the bellows 11, or to the space between the movable tube 15 and the stationary tube 19, it will be understood that a static pressure error equation similar to that described above can be derived, and compensation can be made in a similar manner.

Advantages

One advantage of the present invention is that the seal is nonmechanical, and hence is substantially frictionless so that it cannot affect the accuracy of the instrument readings, and will exert the minimum load upon the internal measuring elements.

Another advantage is that the single liquid seal, herein disclosed, will have substantially no static pressure error, or will have an intentional error which is exactly compensated by the desired static pressure in the instrument.

A further advantage is that the range and static pressure limits of the apparatus may be easily determined by changing the height of the stationary tube 19 and the specific gravity of the sealing liquid S.

While there has been disclosed in this specification one form in which the invention may be embodied, it is to be understood that this form is shown for the purpose of illustration only, and that the invention is not limited to the specific disclosure, but may be modified and embodied in various other equivalent forms without departing from its spirit. In short, the invention includes all the modifications and embodiments coming within the scope of the following claims.

Having thus fully described the invention, what is claimed as new and for which it is desired to secure Letters Patent is:

1. In an instrument for measuring and indicating fluid differential pressures, a casing having means for connection with a first source of fluid pressure to be measured, motion transmitting and sealing means comprising a vertical bellows located within said casing and rigidly connected to the bottom thereof, means passing through the bottom of said casing and said bellows for connecting the inside of said bellows with a second source of fluid pressure, a transparent well detachably secured to and extending below the bottom of said casing and containing a sealing liquid, a first movable tube connected at its top to the center of the upper free end portion of said bellows and having its lower end extending into the liquid in said well, a second stationary tube located concentrically within said movable tube and rigidly connected to the top of said casing and having its lower end extending into the liquid in said well, a vertical movable shaft located concentrically within said second tube, and connected to the bottom of said first movable tube and extending out of the top of said casing, and linkage means connected to the top of said shaft for indicating on an exterior scale the vertical movements of said shaft.

2. The invention as defined in claim 1, in which the upper end of said liquid containing well is detachably screwed into a threaded sleeve depending from and secured to the bottom of said casing.

3. The invention as defined in claim 1, in which said shaft is connected at its lower end to a perforated disk secured within the bottom of said movable tube, and in which said movable tube extends below the lower end of said stationary tube.

4. In an instrument for measuring and indicating differential gas pressures, a casing having means for connection with a first source of pressure to be measured, a movable hollow pressure measuring element located within said casing and rigidly connected to the bottom thereof, means passing through the bottom of said casing and said pressure measuring element for connecting the inside of said pressure measuring element with a second source of gas pressure, a transparent well detachably secured to and extending below the bottom of said casing and containing a sealing liquid, a first movable tube connected at its top to the free upper end of said pressure measuring element and having its lower end extending below the level of the liquid in said well, a second stationary tube located concentrically within said movable tube, rigidly connected to the top of said casing and having its lower end extending into the sealing liquid in said well, a vertical movable shaft located within said stationary tube and connected to the bottom of said first movable tube and extending out of the top of said casing, and linkage means connected to the top of said shaft for indicating on an exterior scale the vertical movements of said shaft caused by variations in the differential gas pressure.

5. The invention as defined in claim 1, in which the top of said bellows is provided with a horizontal recess which serves as a reservoir to receive overflowing sealing liquid during periods of excessive pressure in said instrument.

6. The instrument as defined in claim 4, in which the parts thereof are so constructed as to satisfy the following mathematical equations:

$$E = \frac{P_S[A_S(S_1+S_2) - A_T S_3]100}{P_D[(A_S+A_T)S_1 + A_E(S_1+S_2+S_3)]}$$

where

E is the static pressure error of the liquid seal,
$P_S$ is the ambient static pressure,
$P_D$ is the differential pressure,
$A_S$ is the cross-sectional area of the output shaft,
$A_T$ is the cross-sectional area of the movable tube,
$A_E$ is the effective cross-sectional area of the pressure measuring element outside the movable tube,
$S_1$ is the cross-sectional area of the sealing liquid between the liquid containing well and the movable tube,
$S_2$ is the cross-sectional area of the sealing liquid between the movable tube and the stationary tube, and
$S_3$ is the cross-sectional area between the output shaft and the stationary tube.

7. The invention as defined in claim 1, in which the cross-sectional areas of the movable tube, the output shaft, the sealing liquid between said container and said movable tube, the sealing liquid between said movable tube and said stationary tube, and the sealing liquid within said stationary tube, are arranged to effectively satisfy the following equation:

$$A_S(S_1+S_2) = A_T S_3$$

where $A_T$ represents the cross-sectional area of the movable tube, $A_S$ the cross-sectional area of the output shaft, $S_1$, $S_2$, $S_3$, represent the cross-sectional areas of the liquid between said control well and said movable tube, between said movable tube and the stationary tube, and within said stationary tube, respectively.

8. The invention as defined in claim 1, in which said transparent well is provided with a vertical scale to indicate the level of the sealing liquid within said well.

References Cited in the file of this patent

UNITED STATES PATENTS

| | | |
|---|---|---|
| 1,847,472 | Conte | Mar. 1, 1932 |
| 2,652,846 | Dunn | Sept. 22, 1953 |